Jan. 7, 1969  C. WALDROP  3,420,569
CATTLE END GATE
Filed Jan. 29, 1968
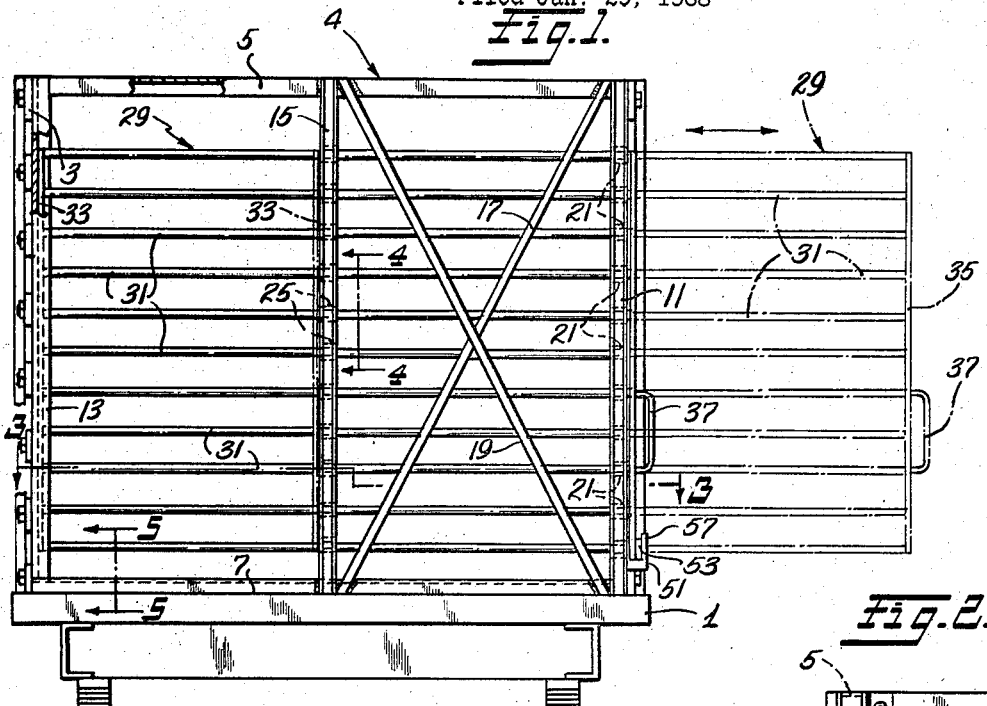
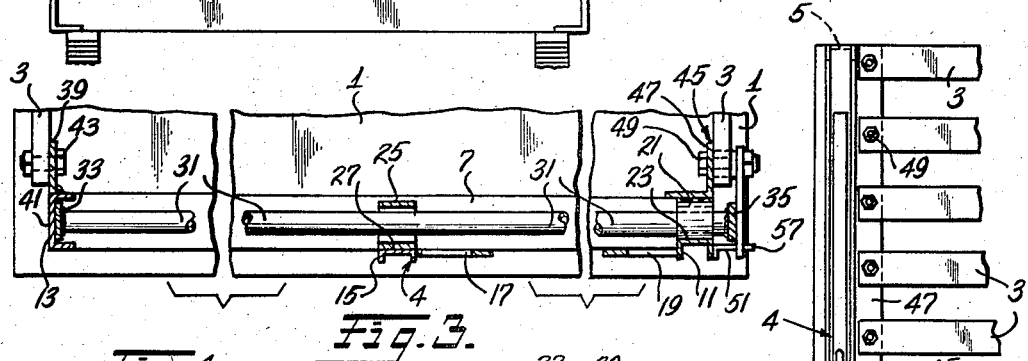
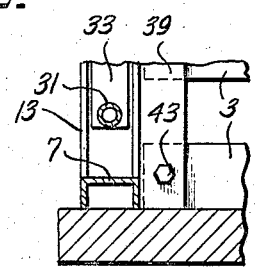
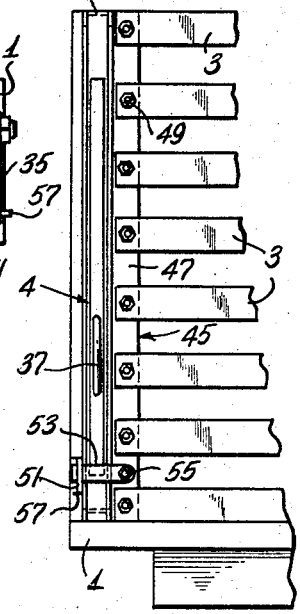
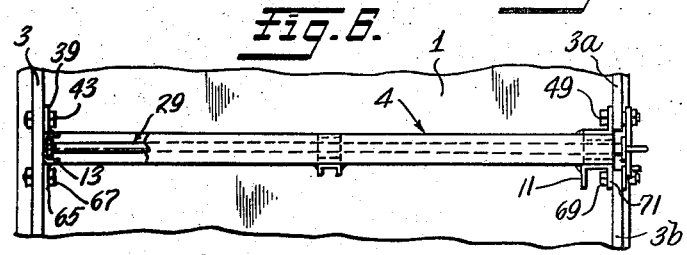
INVENTOR.
CHARLIE WALDROP
BY Bacon & Thomas
ATTORNEYS United States Patent Office 3,420,569
Patented Jan. 7, 1969

3,420,569
CATTLE END GATE
Charles Waldrop, Star Rte. 1, Box 16,
Deming, N. Mex. 88030
Filed Jan. 29, 1968, Ser. No. 701,216
U.S. Cl. 296—50   6 Claims
Int. Cl. B62d 25/02; B62d 33/00; E05d 13/02

ABSTRACT OF THE DISCLOSURE

An end gate having a rigid, metallic outer frame fastenable between the sides of a truck body. A vertical support member which is welded rigidly to the top and bottom of the frame, is located intermediate the frame side members. A number of vertically spaced, pairs of bushings are welded in horizontal, axial alignment to the support member and to one of the sides of the frame. The gate closure is formed of parallel metallic tubes which slide in the pairs of bushings and the closure is made rigid by vertical end members welded to the inner and outer ends of the tubes.

The present invention relates to end gate construction for vehicles used in hauling livestock, farm produce or supplies. In the past, end gates for vehicles have been constructed and arranged in such a manner that they readily become damaged or difficult to operate after being subjected to the impact of heavy livestock or other material. It is an object of this invention to overcome the deficiencies of the type just mentioned.

Another object of this invention is to provide an end gate with a slidable section which will not be damaged or made inoperative due to the impact of heavy livestock or produce thereon.

A further object is to provide an end gate which may be installed between the side walls of a vehicle either at the rear end of the vehicle body or midway between the opposite ends thereof and which serves to strengthen and reinforce the vehicle body.

An additional object of the invention is to provide an end gate which extends transversely across the area of the vehicle body and which cannot be opened or otherwise moved by livestock being carried in the vehicle.

Further objects of the invention include providing an end gate which is rugged, economical to manufacture, simple in construction, and one which will give long and satisfactory service over a long period of time without requiring repair or maintenance.

These and other objects of the invention will become more apparent from the following specification when taken in conjunction with the drawings in which:

FIG. 1 is an elevational view, partly in section, of the end gate of the present invention, mounted at the rear of a vehicle, the open position of the gate being shown in phantom lines;

FIG. 2 is an end elevational view of the gate as viewed from the right of FIG. 1;

FIG. 3 is an enlarged, staggered, fragmentary, horizontal, sectional view taken from the line 3—3 of FIG. 1;

FIG. 4 is an enlarged fragmentary vertical sectional view taken on the line 4—4 of FIG. 1;

FIG. 5 is an enlarged fragmentary vertical sectional view taken on the line 5—5 of FIG. 1; and FIG. 6 is a fragmentary plan view of a modified form of the invention showing the gate assembled to the side walls of a vehicle intermediate the opposite ends of the body.

Referring now more particularly to the construction and arrangement of the end gate of this invention, only the parts of the truck necessary to illustrate the location and means for attaching the present end gate to the side walls of the vehicle body are shown. The floor 1 of the truck body is shown to be substantially flat and may be formed of either wood or metal in the conventional manner. The side walls of the body of the truck are shown as being formed of a plurality of horizontally disposed, spaced apart slats 3 which may be formed of either wood or metal. As shown in FIGS. 1–5, the end gate is disposed transversely of the vehicle body at the rear end thereof.

The end gate of the present invention includes a rigid outer frame 4 of generally square or rectangular configuration preferably formed entirely of metal members which are welded together at the corners. The top member 5 of the frame and the bottom member 7 are shown as being formed of channel iron with the opening in the channel irons facing downwardly.

One of the vertically extending side members of the frame 4 is formed of a channel member 11 which is welded to the top and bottom channel members 5 and 7, respectively, with the opening in the channel iron 11 facing rearwardly of the vehicle body. The other side member 13, also formed of channel iron, is welded to the top and bottom frame members 5 and 7 with the opening in the channel iron 13 facing inwardly of the frame opening and toward the channel iron 11.

A vertically extending support member 15 formed of channel iron is welded to the top and bottom frame members 5 and 7 approximately midway between the vertically extending side members 11 and 13 with the channel opening facing rearwardly of the vehicle body. The frame is reinforced, if desired, by diagonally extending metallic strips 17 and 19 which are suitably welded to the rearward face of the top and bottom frame members 5 and 7.

A plurality of bushings or sleeves 21, which may be in the form of short pieces of metallic pipe, are welded in equally spaced apart relation to the forward face of the web 23 of the channel iron 11 with the axis of each bushing extending in a horizontal direction. Additional bushings 25, equal in number to the bushings 21 welded to the side member 11 of the frame, are welded to the forward surface of the web 27 of the support member 15 with their axis horizontally disposed and in axial alignment with a corresponding bushing 21. The respective pairs of axially aligned bushings 21 and 25 serve as guide sleeves for a sliding closure generally designated by the numeral 29.

The sliding closure 29, which controls the opening in the frame 4 defined by the side member 13, the support member 15 and the portion of top member 5 and bottom member 7 extending between the side member 13 and the support member 15, is formed by a plurality of elongated members 31 which are of such a size as to be freely slidable in corresponding, axially aligned bushings 21 and 25. The elongated members 31 are preferably formed of metal pipe and are of such length as to extend from adjacent the inner side of channel member 13 to adjacent the outer side of the side member 11. The inner ends of the metallic pipes 31 are welded to a metallic inner end member 33 while the outer end of the pipes 31 is welded to a metallic outer end member 35. In order to slide the closure between the open and closed positions, a U-shaped metallic handle 37 is welded to the outer surface of the outer end member 35.

In order to secure the end gate to the sides of a truck body, a vertically extending metal strip 39 is welded to the forward surface of the side member 13 to form a flange in alignment with the web 41 of the channel iron 13. Suitable openings are formed in the metallic strip 39 in alignment with corresponding openings formed in slats 3 through which bolts 43 are passed for securing the frame side member 13 to the adjacent side wall of the vehicle body. At the other side of the frame 4, a vertically extending angle iron 45 in welded to the forward surface of the bushings 21. The free leg 47 of the angle iron 45 is arranged to extend forwardly of the frame 4 parallel with the inner surface of the adjacent slats 3. The slats 3, adjacent the outer or rearward end thereof, are formed with openings in alignment with similar openings in the leg 47 of angle iron 45 through which bolts 49 are inserted for fastening of the frame side member 11 to the adjacent side of the vehicle body.

In order to maintain the closure 29 in the closed position, an L-shaped keeper 51 is welded to the outer surface of the channel member 11 near its lower end. A pivoted latch 53 is pivotally mounted at one end thereof on a bolt 55 which passes through a suitable opening formed in the leg 47 of the angle iron 45. The pivoted latch 53 is of sufficient length to extend slightly beyond the L-shaped keeper 51 and to drop in back of the upstanding lug 57 forming the outer end of the keeper. When in the latched position, the latch member 53 engages the outer surface of the end member 35 of the sliding closure 29, thereby preventing the gate from sliding to the right, as viewed in FIGS. 1 and 2, that is from the closed to the opened position.

It will be seen that, when closure 29 is in the closed position, the inner end member 33 of the closure is disposed in the opening of the side channel iron 13 of the frame 4. Thus, in the event of pressure being exerted against the elongated closure members 31 from within the body of the truck, the member 33 will engage the inner side walls of the channel iron 13 and be restrained from further movement. With the pivoted latch 53 in the released position, that is pivoted out of alignment with the end member 35 of the sliding closure, the handle 37 may be grasped and by exerting an outward pull, the closure 29 will slide freely outwardly in the bushings 21 and 25 until the inner end member 33 engages the bushings 25 thereby limiting outward movement of the closure as shown in phantom lines in FIG. 1.

In the form of the invention illustrated in FIG. 6, the end gate of FIGS. 1–5 is shown mounted transversely of the body of the vehicle intermediate the forward and rear ends thereof. In order to permit the closure to slide between the open and the closed positions, the slats 3 on the right hand side of the truck body, as viewed in FIG. 6, are spaced apart a short distance to provide a vertical opening for passage of the sliding closure 29. The slats forming the right hand side wall of the forward portion of the body are designated 3a while those forming the rearward portion are designated 3b. Otherwise, the reference numerals employed to designate parts of the end gate of FIG. 6 are the same as those employed to designate like parts in FIGS. 1–5.

As shown, the forward side of the end gate 4 is secured at the left hand side to the slats 3 by the bolts 43 and at the right hand side is secured to the slats 3a by the bolts 49, in the same manner as has already been described in connection with FIGS. 1–5. In order to further reinforce the gate connection to the left hand side of the body, a vertical metallic strip 65 is welded to the rearward surface of the channel iron 13. The vertical strip 65 is fastened to the slats 3 by bolts 67 passing through suitable openings formed in alignment through the slats 3 and the strip 65. The side of the frame 4 of the end gate shown at the right hand side as viewed in FIG. 6 is secured to the forward end of the slats 3b by bolts 69 which pass through aligned openings formed in the slats 3b and in the outer leg 71 of the channel iron 11 which forms one of the side members of the rigid frame 4. Thus the sliding closure 29 is in alignment with the vertical passage between the ends of the slats 3a and 3b.

While a preferred form of the invention has been disclosed and described by way of example, various changes, alterations, modifications, and arrangement of parts will occur to others skilled in the art. For example, the side walls of the vehicle may be formed of solid sheet material or may consist of a rack in which the slats extend in a vertical direction. In any event, the frame of the present end gate would be securely bolted to the sides of the vehicle body. While channel iron welded together at the corners has been disclosed as the preferred material for forming a strong frame, it is obvious that other structural members could be substituted for the channel iron. In addition, solid metallic rods could be substituted for the metallic pipes 31 of the sliding closure without departing from the spirit of the invention.

I claim:
1. An end gate to be fixedly connected between the sides of a truck body, comprising: a rigid frame having parallel, vertically disposed side members and parallel, horizontally disposed, top and bottom members; vertically disposed, rigid support means positioned intermediate said side members and extending between said top and bottom members, said support means being spaced from said side members and being fixedly secured to said top and bottom members; a first plurality of spaced apart, horizontally disposed, tubular guide bushings rigid with one of said side members; a second plurality of spaced apart, horizontally disposed, tubular guide bushings rigid with said support member and in axial alignment with said first plurality of bushings; and a closure slidably mounted in the plurality of pairs of axially aligned bushings, said closure comprising a plurality of elongated members slidably disposed in said aligned bushings and extending from adjacent the inner side of the other of said side members to adjacent the outer side of said one side member, and vertically extending inner and outer end members rigidly fixed to the inner and outer ends, respectively, of said elongated members.

2. An end gate as defined in claim 1 wherein said frame members, said support means, said bushings and said closure members are formed of metal and said elongated members are tubular.

3. An end gate as defined in claim 1 wherein said other side member is a channel iron with the opening thereof facing toward said one side member and said inner end member is disposed between the parallel sides of said channel iron and contiguous to the web thereof when said closure is in the closed position.

4. An end gate as defined in claim 1 wherein a handle is fixed to the outer side of said outer end member for sliding said closure between a closed and an open position, and latch means is mounted on said one side member and is engageable with said outer end member for maintaining said closure in the closed position.

5. An end gate as defined in claim 1 wherein said side members include flange means rigid therewith and extending forwardly from the forward side of said side members, said flange means having fastener openings formed therein for securing said end gate to the sides of a truck body.

6. An end gate as defined in claim 5 wherein said side members also include second flange means rigid therewith and extending rearwardly from the rearward side of said side members, said second flange means having fastener openings formed therein whereby said end gate may be secured to the sides of a truck intermediate the opposite ends thereof.

References Cited
UNITED STATES PATENTS

| | | |
|---|---|---|
| 285,611 | 9/1883 | Gosshorn. |
| 1,710,944 | 4/1929 | Olsen _____ 296—50 |
| 2,797,959 | 7/1957 | Brice _____ 296—50 |
| 2,972,825 | 2/1961 | Stillwell et al. _____ 49—55 XR |

LEO FRIAGLIA, *Primary Examiner.*

L. DANIEL MORRIS, JR., *Assistant Examiner.*

U.S. Cl. X.R.

49—410; 105—378; 220—29